(12) United States Patent
Sibille (10) Patent No.: US 11,429,840 B2
(45) Date of Patent: Aug. 30, 2022

(54) LEARNING PARAMETER INVARIANT IMAGE RECONSTRUCTION EMBEDDING FOR AI SYSTEMS

(71) Applicant: Siemens Medical Solutions USA, Inc., Malvern, PA (US)

(72) Inventor: Ludovic Sibille, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 545 days.

(21) Appl. No.: 16/582,263

(22) Filed: Sep. 25, 2019

(65) Prior Publication Data

US 2021/0089861 A1 Mar. 25, 2021

(51) Int. Cl.
*G06N 3/04* (2006.01)
*G06K 9/62* (2022.01)

(52) U.S. Cl.
CPC ............ *G06N 3/04* (2013.01); *G06K 9/6256* (2013.01); *G06K 9/6267* (2013.01)

(58) Field of Classification Search
CPC ....... G06N 3/04; G06K 9/6256; G06K 9/6267
See application file for complete search history.

(56) References Cited

U.S. PATENT DOCUMENTS

| | | | |
|---|---|---|---|
| 11,037,030 B1* | 6/2021 | Kolouri | G06K 9/6267 |
| 2020/0134876 A1* | 4/2020 | Park | G06N 3/0472 |
| 2020/0294241 A1* | 9/2020 | Wu | G06T 7/10 |
| 2021/0295108 A1* | 9/2021 | Bar | G06T 7/62 |
| 2021/0350591 A1* | 11/2021 | Hu | G06T 11/005 |
| 2021/0398329 A1* | 12/2021 | Goedicke | G06T 11/005 |
| 2022/0130084 A1* | 4/2022 | Litwiller | G06V 10/454 |

FOREIGN PATENT DOCUMENTS

WO WO-2017151757 A1 * 9/2017

OTHER PUBLICATIONS

Yamashita, Rikiya, et al. "Convolutional neural networks: an overview and application in radiology." Insights into imaging 9.4 (2018): 611-629. (Year: 2018).*

* cited by examiner

*Primary Examiner* — Utpal D Shah (57) ABSTRACT

A computer-implemented method for classifying a reconstruction includes receiving an uncategorized reconstruction and applying a trained classification function configured to classify the uncategorized reconstruction into one of a plurality of categories. The plurality of categories are based on a labeled data-set including a plurality of labeled reconstructions. The trained classification function uses reconstruction-invariant features for classification. The method further includes storing a label indicating a selected one of the plurality of categories for the uncategorized reconstruction.

20 Claims, 6 Drawing Sheets

LEARNING PARAMETER INVARIANT IMAGE RECONSTRUCTION EMBEDDING FOR AI SYSTEMS

TECHNICAL FIELD

This application relates generally to training of machine learning models and, more particularly, to training machine learning models using unlabeled and labeled data sets.

BACKGROUND

During nuclear imaging, a patient is positioned on a table and data is obtained using one or more scanning modalities, such as, for example, computerized-tomography (CT), positron-emission tomography (PET), single-photon emission computerized tomography (SPECT), etc. Multiple data sets may be collected for a single patient. Different types of reconstructions are generated to control for and/or eliminate artifacts. Although each reconstruction uses different parameters, the underlying patient is the same for each reconstruction.

Supervised machine learning systems have been proposed to assist in classification of reconstructions generated from nuclear imaging data, for example, identifying abnormal regions in an image, disease classification, risk stratification, etc. Proposed machine learning systems require a large volume of high quality annotated data (e.g., labeled data) for training. Such data is expensive and time consuming to acquire. Current annotated data sets are limited to specific reconstruction parameters or algorithms, generally include a single reconstruction of the nuclear imaging data, and cannot be used for generating reconstruction parameters or predictions for alternative reconstructions or algorithms.

SUMMARY

In various embodiments, a computer-implemented method for classifying a reconstruction includes receiving an uncategorized reconstruction and applying a trained classification function configured to classify the uncategorized reconstruction into one of a plurality of categories. The plurality of categories are based on a labeled data-set including a plurality of labeled reconstructions. The trained classification function uses reconstruction-invariant features for classification. The method further includes storing a label indicating a selected one of the plurality of categories for the uncategorized reconstruction.

In various embodiments, a computer-implemented method for generating a trained neural network configured to classify a reconstruction includes receiving an unlabeled data set and a labeled data set. The labeled data set includes a plurality of reconstructions each classified into one of a first category or a second category. The method further includes generating a regularization term using one or more reconstructions based on the unlabeled data set. The regularization term is configured to reduce embedding variations. The method further includes generating a trained classification network using the labeled data set and the regularization term. The trained classification network is configured to classify unlabeled reconstructions one of the first category or the second category. The method further includes storing the trained classification network.

In various embodiments, a system including a nuclear imaging scanner having at least a first modality configured to generate raw nuclear imaging data and a computer. The computer is configured to receive the raw nuclear imaging data and generate at least one reconstruction. The computer is further configured to apply a trained classification function configured to classify the uncategorized reconstruction into one of a plurality of categories. The plurality of categories are based on a labeled data sat including a plurality of labeled reconstructions. The trained classification function uses reconstruction-invariant features for classification. The non-transitory storage unit is configured to store a label indicating a selected one of the plurality of categories for the uncategorized reconstruction.

BRIEF DESCRIPTION OF THE DRAWINGS

The following will be apparent from elements of the Figures, which are provided for illustrative purposes and are not necessarily drawn to scale.

DETAILED DESCRIPTION

This description of the exemplary embodiments is intended to be read in connection with the accompanying drawings, which are to be considered part of the entire written description.

In the following, various embodiments are described with respect to the claimed providing systems as well as with respect to the claimed methods. Features, advantages or alternative embodiments herein can be assigned to the other claimed objects and vice versa. In other words, claims for the providing systems can be improved with features described or claimed in the context of the methods. In this case, the functional features of the method are embodied by objective units of the providing system.

Furthermore, in the following, various embodiments are described with respect to methods and systems for classifying reconstructions of nuclear imaging data as well as with respect to methods and systems for training a classification network using at least one set of labeled reconstructions and at least one set of unlabeled reconstruction. Features, advantages or alternative embodiments herein can be assigned to the other claimed objects and vice versa. In other words, claims for methods and systems for training a classification network using at least one set of labeled reconstructions and at least one set of unlabeled reconstruction can be improved with features described or claimed in context of the methods and systems for classifying reconstructions of nuclear imaging data, and vice versa.

In particular, the trained classification function of the methods and systems for classifying reconstructions of nuclear imaging data can be adapted by the methods and systems for training a classification network using at least one set of labeled reconstructions and at least one set of unlabeled reconstruction. Furthermore, the input data can comprise advantageous features and embodiments of the training input data, and vice versa. Furthermore, the output data can comprise advantageous features and embodiments of the output training data, and vice versa.

In general, a trained function mimics cognitive functions that humans associate with other human minds. In particular, by training based on training data the trained function is able to adapt to new circumstances and to detect and extrapolate patterns.

In general, parameters of a trained function can be adapted by means of training. In particular, a combination of supervised training, semi-supervised training, unsupervised training, reinforcement learning and/or active learning can be used. Furthermore, representation learning (an alternative term is "feature learning") can be used. In particular, the parameters of the trained functions can be adapted iteratively by several steps of training.

In particular, a trained function can comprise a neural network, a support vector machine, a decision tree and/or a Bayesian network, and/or the trained function can be based on k-means clustering, Qlearning, genetic algorithms and/or association rules. In particular, a neural network can be a deep neural network, a convolutional neural network or a convolutional deep neural network. Furthermore, a neural network can be an adversarial network, a deep adversarial network and/or a generative adversarial network.

Figure 1:
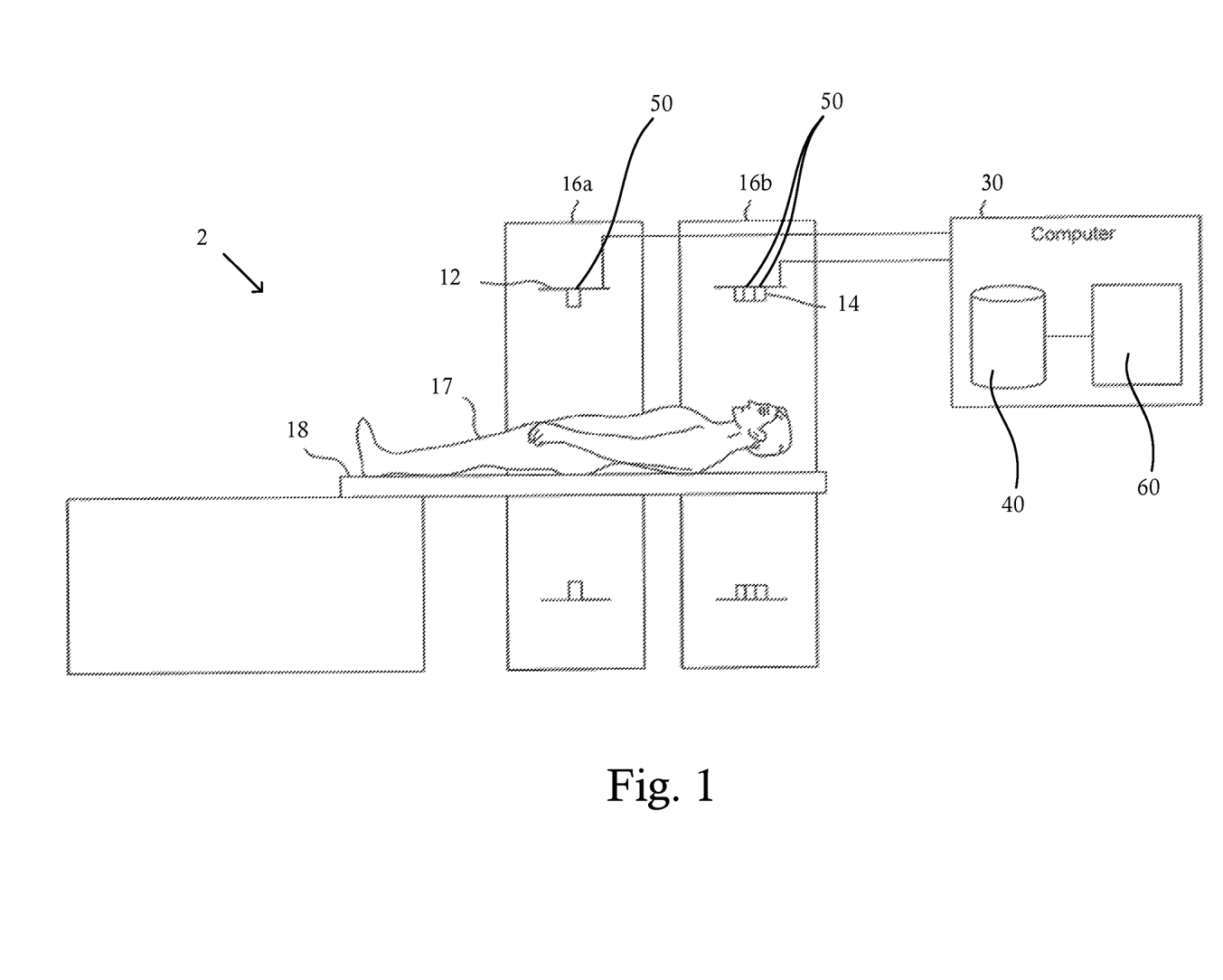
FIG. 1 illustrates a nuclear imaging system, in accordance with some embodiments.

FIG. 1 illustrates one embodiment of a nuclear imaging system 2, in accordance with some embodiments. The nuclear imaging system 2 includes a scanner for at least a first modality 12 provided in a first gantry 16a. The first modality 12 can include any suitable imaging modality, such as a computed tomography (CT) modality, a positron emission tomography (PET) modality, a single-photon emission computerized tomography (SPECT) modality, etc. A patient 17 lies on a movable patient bed 18 that may be movable between a gantry. In some embodiments, the nuclear imaging system 2 includes a scanner for a second imaging modality 14 provided in a second gantry 16b. The second imaging modality 14 can be any suitable imaging modality, such as, for example, PET modality, a SPECT modality, a CT modality, and/or any other suitable imaging modality. Each of the first modality 12 and/or the second modality 14 can include one or more detectors 50 configured to detect an annihilation photon, gamma ray, and/or other nuclear imaging event.

Scan data from the first modality 12 and/or the second modality 14 is stored at one or more computer databases 40 and processed by one or more computer processors 60 of a computer system 30. The graphical depiction of computer system 30 in FIG. 1 is provided by way of illustration only, and computer system 30 may include one or more separate computing devices. The nuclear imaging data sets can be provided by the first modality 12, the second modality 14, and/or may be provided as a separate data set, such as, for example, from a memory coupled to the computer system 30. The computer system 30 can include one or more processing electronics for processing a signal received from one of the plurality of detectors 50.

In some embodiments, the computer system 30 is configured to generate and/or classify one or more reconstructions based on the nuclear imaging data obtained by the first modality 12 and/or the second modality 14. Each reconstruction may be generated using any suitable reconstruction parameters, such as any suitable reconstruction algorithms, noise values, event counts, etc. The reconstruction(s) may be classified using a trained classification model (or function) configured to classify (or sort) the reconstruction(s) into one of a plurality of predetermined categories. For example, in some embodiments, the plurality of predetermined categories may include the presence/absence of abnormal tissue, the presence/absence of a hematoma, healthy or abnormal, etc.

Figure 2:
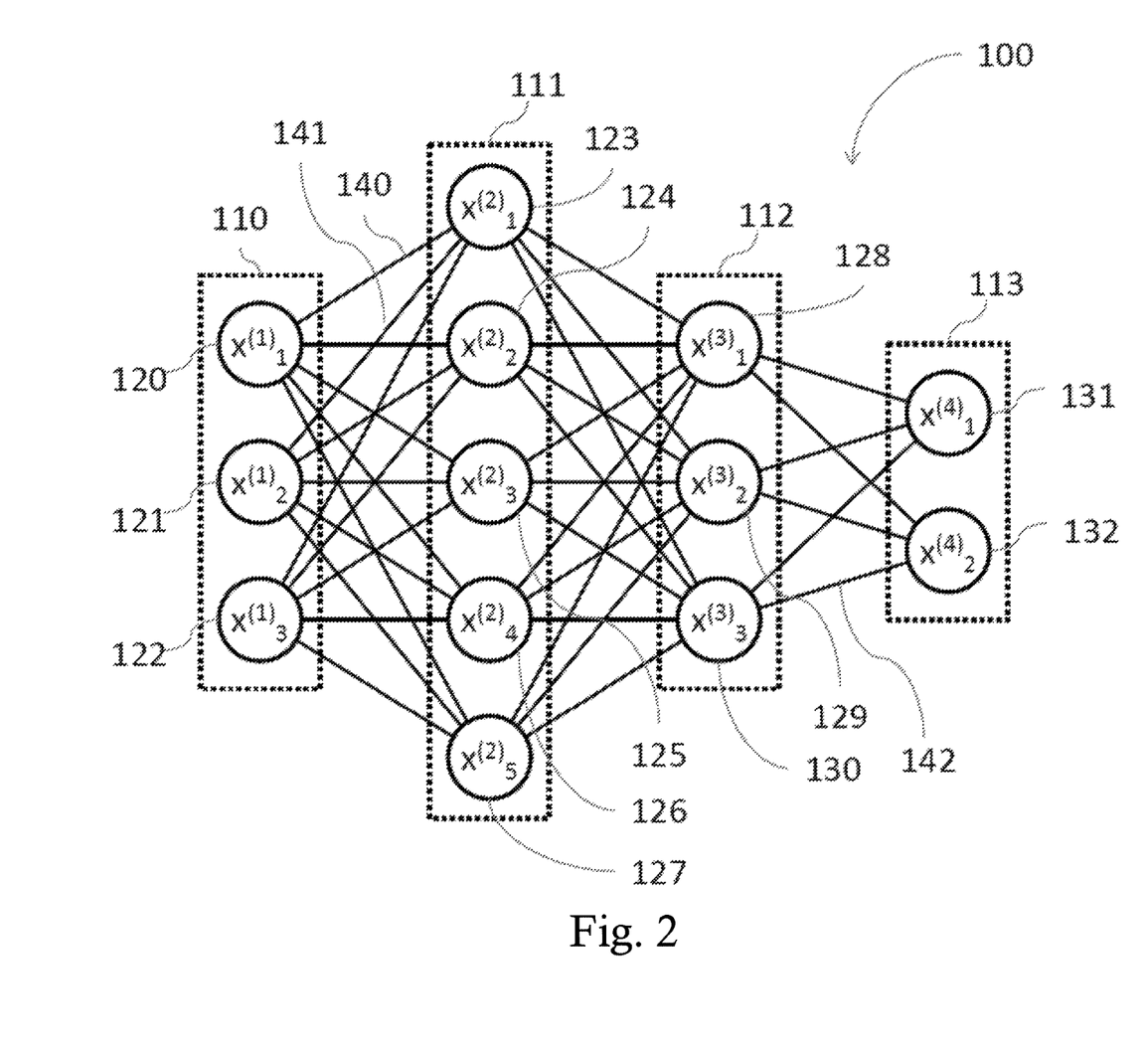
FIG. 2 illustrates an embodiment of an artificial neural network, in accordance with some embodiments.

FIG. 2 displays an embodiment of an artificial neural network 100. Alternative terms for "artificial neural network" are "neural network," "artificial neural net," "neural net," or "trained function." The artificial neural network 100 comprises nodes 120-132 and edges 140-142, wherein each edge 140-142 is a directed connection from a first node 120-132 to a second node 120-132. In general, the first node 120-132 and the second node 120-132 are different nodes 120-132, although it is also possible that the first node 120-132 and the second node 120-132 are identical. For example, in FIG. 2 the edge 140 is a directed connection from the node 120 to the node 123, and the edge 142 is a directed connection from the node 130 to the node 132. An edge 140-142 from a first node 120-132 to a second node 120-132 is also denoted as "ingoing edge" for the second node 120-132 and as "outgoing edge" for the first node 120-132.

In this embodiment, the nodes 120-132 of the artificial neural network 100 can be arranged in layers 110-113, wherein the layers can comprise an intrinsic order introduced by the edges 140-142 between the nodes 120-132. In particular, edges 140-142 can exist only between neighboring layers of nodes. In the displayed embodiment, there is an input layer 110 comprising only nodes 120-122 without an incoming edge, an output layer 113 comprising only nodes 131, 132 without outgoing edges, and hidden layers 111, 112 in-between the input layer 110 and the output layer 113. In general, the number of hidden layers 111, 112 can be chosen arbitrarily. The number of nodes 120-122 within the input layer 110 usually relates to the number of input values of the neural network, and the number of nodes 131, 132 within the output layer 113 usually relates to the number of output values of the neural network.

In particular, a (real) number can be assigned as a value to every node 120-132 of the neural network 100. Here, $x^{(n)}_i$ denotes the value of the i-th node 120-132 of the n-th layer 110-113. The values of the nodes 120-122 of the input layer 110 are equivalent to the input values of the neural network 100, the values of the nodes 131, 132 of the output layer 113 are equivalent to the output value of the neural network 100. Furthermore, each edge 140-142 can comprise a weight being a real number, in particular, the weight is a real number within the interval [−1, 1] or within the interval [0, 1]. Here, $w^{(m,n)}_{i,j}$ denotes the weight of the edge between the i-th node 120-132 of the m-th layer 110-113 and the j-th node 120-132 of the n-th layer 110-113. Furthermore, the abbreviation $w^{(n)}_{i,j}$ is defined for the weight $w^{(n,n+1)}_{i,j}$.

In particular, to calculate the output values of the neural network 100, the input values are propagated through the neural network. In particular, the values of the nodes 120-132 of the (n+1)-th layer 110-113 can be calculated based on the values of the nodes 120-132 of the n-th layer 110-113 by $$x_j^{(n+1)} = f(\Sigma_i x_i^{(n)} \cdot w_{i,j}^{(n)})$$

Herein, the function f is a transfer function (another term is "activation function"). Known transfer functions are step functions, sigmoid function (e.g. the logistic function, the generalized logistic function, the hyperbolic tangent, the Arctangent function, the error function, the smoothstep function) or rectifier functions. The transfer function is mainly used for normalization purposes.

In particular, the values are propagated layer-wise through the neural network, wherein values of the input layer 110 are given by the input of the neural network 100, wherein values of the first hidden layer 111 can be calculated based on the values of the input layer 110 of the neural network, wherein values of the second hidden layer 112 can be calculated based in the values of the first hidden layer 111, etc.

In order to set the values $w^{(m,n)}_{i,j}$ for the edges, the neural network 100 has to be trained using training data. In particular, training data comprises training input data and training output data (denoted as $t_i$). For a training step, the neural network 100 is applied to the training input data to generate calculated output data. In particular, the training data and the calculated output data comprise a number of values, said number being equal with the number of nodes of the output layer.

In particular, a comparison between the calculated output data and the training data is used to recursively adapt the weights within the neural network 100 (backpropagation algorithm) In particular, the weights are changed according to $$w'^{(n)}_{i,j} = w^{(n)}_{i,j} - \gamma \cdot \delta^{(n)}_j \cdot x^{(n)}_i$$

wherein $\gamma$ is a learning rate, and the numbers $\delta^{(n)}_j$ can be recursively calculated as $$\delta^{(n)}_j = (\Sigma_k \delta^{(n+1)}_k \cdot w^{(n+1)}_{j,k}) \cdot f'(\Sigma_i x^{(n)}_i \cdot w^{(n)}_{i,j})$$

based on $\delta^{(n+1)}_j$, if the (n+1)-th layer is not the output layer, and $$\delta^{(n)}_j = (x^{(n+1)}_k - t^{(n+1)}_j) \cdot f'(\Sigma_i x^{(n)}_i \cdot w^{(n)}_{i,j})$$

if the (n+1)-th layer is the output layer 113, wherein f' is the first derivative of the activation function, and $y^{(n+1)}_j$ is the comparison training value for the j-th node of the output layer 113.

In some embodiments, the neural network 100 is configured, or trained, to classify received nuclear imaging data into one of a plurality of categories corresponding to a clinical determination. For example, in some embodiments, the neural network 100 is configured to receive nuclear imaging data generated using at least a first imaging modality 12 for a first patient. The neural network 100 may receive the nuclear imaging data in any suitable form, such as, for example, a reconstruction generated from raw listmode or sinogram data, raw data, etc. The neural network 100 is trained to classify the received nuclear imaging data into one of a plurality of predefined categories corresponding to a clinical determination, such as, for example, the presence or absence of a tissue mass, presence or absence of an abnormality, malignant, benign, etc. In such embodiments, each node in the output layer 113 corresponds to one of the potential categorizations. For example, when the predefined categories correspond to the presence or absence of a tissue mass, a first node 131 in the output layer 113 may correspond to the presence of a tissue mass and a second node 132 in the output layer 113 may correspond to the absence of a tissue mass. Although embodiments are illustrated having two nodes 131, 132 in the output layer 113, it will be appreciated that the output layer 113 can include any number of nodes 131-132 each corresponding to a predetermined category or potential classification.

Figure 3:
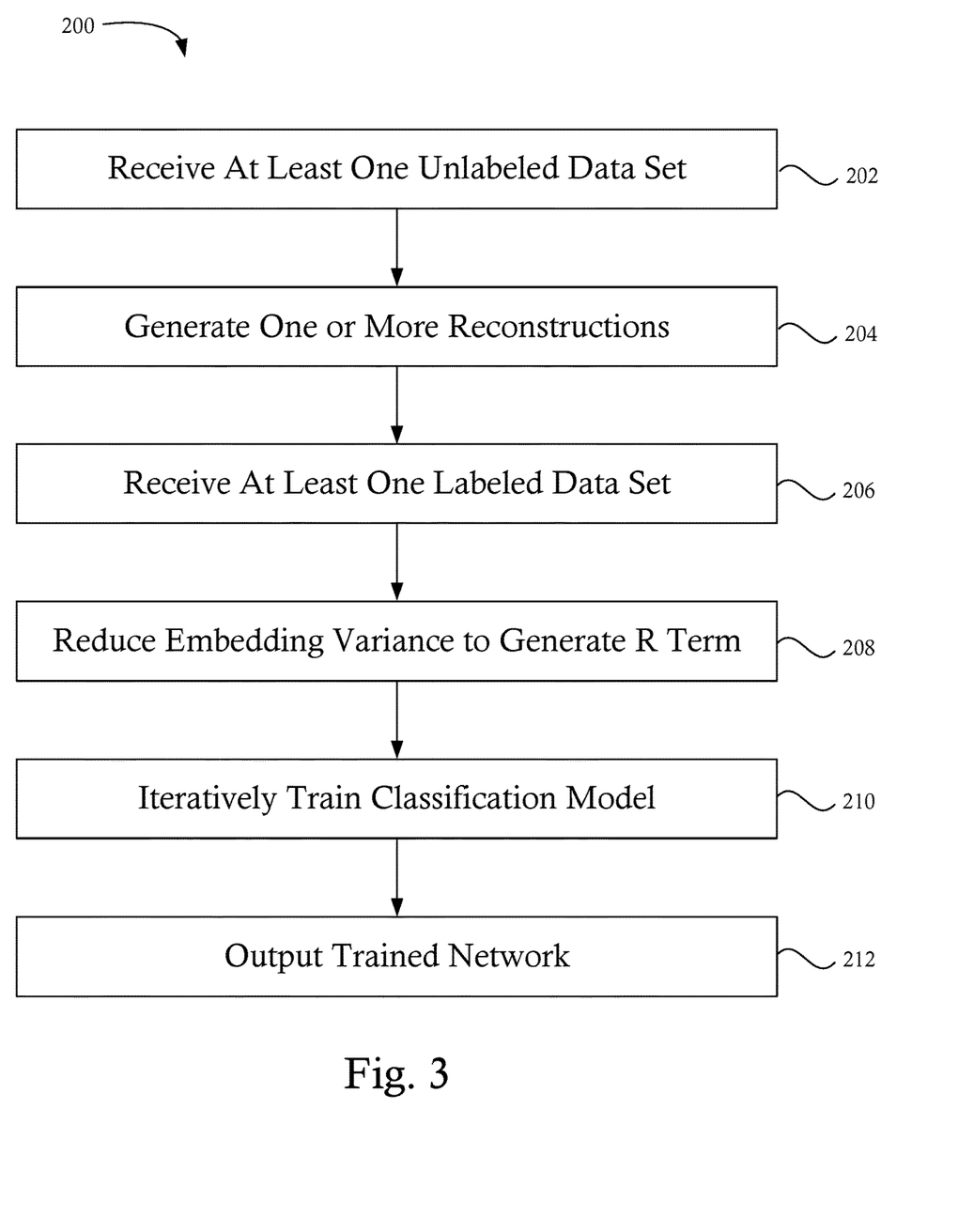
FIG. 3 is a flowchart illustrating a method of training a machine learning function to categorize reconstructions generated from nuclear imaging data, in accordance with some embodiments.
Figure 4:
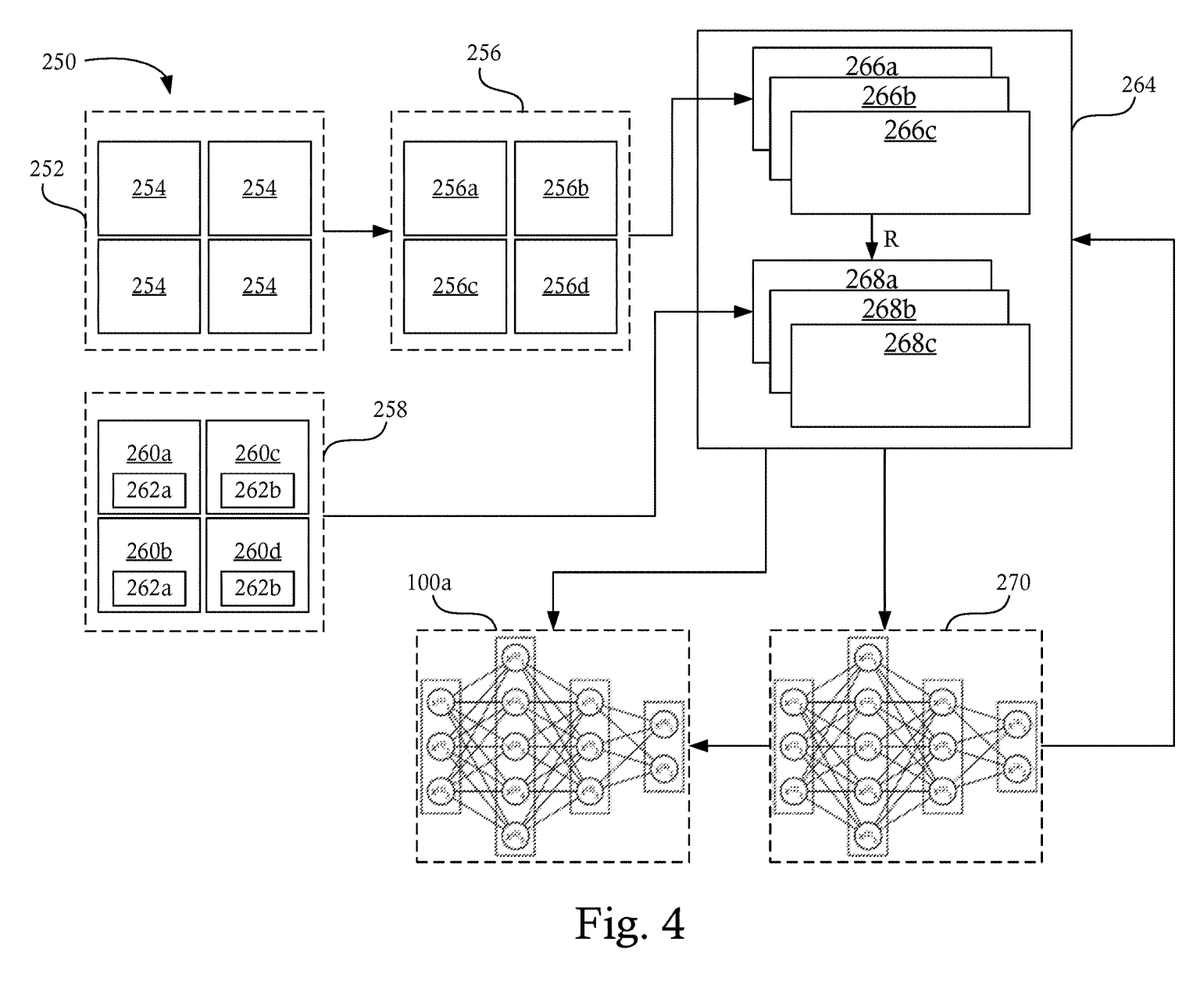
FIG. 4 is a process flow for generating a trained machine learning function to categorize reconstructions according to the method illustrated in FIG. 3, in accordance with some embodiments.

FIG. 3 is a flowchart illustrating a method 200 of generating a trained function (or neural network), such as the neural network 100 discussed above, in accordance with some embodiments. FIG. 4 is a process flow 250 for generating a trained function according to the method 200 illustrated in FIG. 3, in accordance with some embodiments.

At step 202, an unlabeled data set 252 is received. The unlabeled data set 252 includes a plurality of patient data sets 254. Each of the patient data sets 254 may include raw nuclear imaging data, such as sinogram data, listmode data, etc. and/or representations of nuclear imaging data, such as reconstructions, etc. The unlabeled data set 252 may include raw data corresponding to reconstructions contained in a labeled data set 258 (discussed below) and/or may be an independent data set. The unlabeled data set 252 may include data associated with the raw data and/or representations included therein, such as one or more reconstruction parameters (e.g., reconstruction algorithms, noise values, event counts, etc.), imaging modalities, anonymized patient identifiers, etc.

If the received unlabeled data set 252 includes raw nuclear imaging data, then, at optional step 204, at least one reconstruction 256a-256d (collectively "reconstructions 256") is generated for each patient data set 254 in the unlabeled data set 252. The reconstructions 256 may be generated using any suitable reconstruction parameters, such as any suitable reconstruction algorithm, point-spread-function (PSF), time-of-flight (TOF), iterations, subsets, smoothing factor, etc. Multiple reconstructions 256 may be generated for each patient data set 254 using different reconstructions parameters for each reconstruction. If the unlabeled data set 252 received at step 204 is a set of reconstructions 256, step 204 may be skipped.

In some embodiments, two or more reconstructions 256 are generated from a single patient data set 254 and identified as paired reconstructions. Paired reconstructions include different views (e.g., field of view, angle, etc.) of the same underlying patient. The use of raw data allows a large number of reconstructions to be generated from a generally limited data set (labeled or unlabeled), using various reconstruction parameters. In addition, the entire data set (e.g., the entire reconstruction) may be used to reduce embedding variance (as opposed to labeled data that may include only a narrow portion having a label). In some embodiments, paired reconstructions are used to reduce embedding variance, as discussed in greater detail with respect to FIGS. 5-6.

At step 206, a labeled data set 258 is received. The labeled data set 258 includes at least one labeled (e.g., annotated) representation of a set of nuclear imaging data, such as, for example, reconstructions 260a-260d generated from nuclear imaging data using predetermined reconstruction parameters. Each reconstruction 260a-260d included in the labeled data set 258 includes at least one label 262a-262b corresponding to one of a predetermined set of categories (or classifications). In some embodiments, the labeled data set 258 includes at least a first set of reconstructions 260a-260b having a first label 262a indicating a first category and a second set of reconstructions 260c-260d having a second label 262b indicating a second category. For example, in some embodiments, the labeled data set 258 includes a first set of reconstructions 260a-260b including a first label 262a indicating the presence of an abnormal tissue mass (e.g., tumor, hematoma, etc.) and a second set of reconstructions 260c-260d including a second label indicating the absence of an abnormal tissue mass (e.g., indicating only healthy tissue). Although embodiments are discussed herein including a first category (e.g., presence of an abnormal tissue mass) and a second category (e.g., absence of the abnormal tissue mass), it will be appreciated that the set of labeled data can include any number of labeled sets each corresponding to a different predetermined category. The set of supervised data can further include data corresponding to reconstruction parameters (e.g., reconstruction algorithms, noise values, event counts, etc.), imaging modalities, anonymized patient identifiers, and/or any other suitable data associated with the reconstructions.

At steps 208-210, the set of supervised data and the set of unsupervised data are used to train a neural network (e.g., trained function or model). At step 208, a first set of untrained neural network layers 266a-266c (also referred to as embedding layers 266a-266c) are iteratively trained using the reconstructions 256a-256d generated from and/or included in the unlabeled data set 252 to reduce variations in generated embeddings. The embedding layers 266a-266c are iteratively trained to generate reconstruction-agnostic embeddings for each reconstruction 256a-256d. As used herein, the term "embedding" refers to a vector representation of one or more data points. By minimizing variations in generated embeddings, the embedding layers 266a-266c configure a classification model (e.g., a second set of neural network layers 268a-268c) to utilize parameters that are reconstruction invariant (i.e., are independent of the reconstruction parameters used to generate the reconstruction). The use of reconstruction-invariant embeddings improves the robustness of the classification layers 268a-268c in a trained neural network 100a.

The embedding layers 266a-266c may include any suitable unsupervised learning layers that are iteratively configured to generate reconstruction-invariant embeddings. For example, in various embodiments the embedding layers 266a-266c may include clustering layers (e.g., hierarchical clustering, k-means, mixture models, etc.), neural network layers (e.g., autoencoders, deep belief nets, etc.), association layers (apriori, etc.), and/or any other suitable unsupervised learning layers or models.

In some embodiments, the first set of neural network layers 266a-266c introduce (e.g., provide) a regularization term, R, to the classification layers 268a-68c. R may be defined as:

$$R(u; w) = \frac{1}{\#P}\sum_{i,c\in(I,C)} loss_u(\text{embedding}(u_{p1}), \text{embedding}(u_{p2}))$$

where $p_1$, $p_2$ are different reconstructions (e.g., different reconstructions generated from the same patient data set 254) and P is a set of reconstructions 256. The $loss_u$ parameter is configured to penalize supervised training parameters (e.g., parameters used in the classification layers 268a-268c) that create different embeddings of reconstructions 256 of the same data (e.g., reconstructions generated from the same patient data set 254). By penalizing features that create different embeddings, the embedding layers 266a-266c minimize differences that are generated using different reconstruction techniques (e.g., reconstruction algorithm, point-spread-function (PSF), time-of-flight (TOF), iterations, subsets, smoothing factor, etc.) and configure the final trained function 100a to utilize reconstruction-invariant features.

At step 210, a second set of untrained neural network layers 268a-268c (also referred to as classification layers 268a-268c) are iteratively trained using the labeled data set 258 to classify reconstructions into one of the predetermined categories 262a-262b included in the labeled data set 258. For example, if the labeled data set 258 includes a first label 262a indicating the presence of an abnormal tissue mass and a second label 262b indicating the absence of the abnormal tissue mass, classification layers 268a-268c are iteratively configured to classify a received reconstruction into one of the two categories: reconstructions containing the abnormal tissue mass (corresponding to a first label 262a) or reconstructions not containing the abnormal tissue mass (corresponding to a second label 262b). After each iteration through the labeled data set 258, an intermediate neural network 270 (e.g., an intermediate function) is generated. The intermediate neural network 270 is iteratively refined using the unlabeled data set 252 and the labeled data set 258, based on the successful and unsuccessful classifications generated using the intermediate neural network 270.

In some embodiments, a portion of the labeled data set 258 may be maintained as a validation data set. Alternatively and/or additionally, a second labeled data set may be received and used for validation of the intermediate neural network 270 and/or the final trained neural network 100a. The classification layers 268a-268c may include any suitable set of supervised learning layers (e.g., models, algorithms, etc.), such as, for example, support vector machines, linear regression layers, logistic regression layers, naïve Bayes layers, linear discriminant analysis layers, decisions tree layers, k-nearest neighbor layers, multilayer perceptron layers, similarity learning layers, and/or any other suitable supervised learning layer.

In some embodiments, the classification layers 268a-268c are configured to operate on an embedding representation of a reconstruction, such as a single-vector embedding (e.g., a feature vector.) The classification layers 268a-268c are modified by the inclusion of the regularization term R generated by embedding layers 266a-266c to utilize reconstruction-invariant features for classification purposes. For example, in some embodiments, the training of a supervised classification model (e.g., classification layers 268a-268c) can be summarized by the equation:

$$L(I, C; w) = \frac{1}{\#I}\sum_{i,c\in(I,C)} loss_c(f(i; w), c)$$

where $loss_c$ represents a supervised loss function (e.g., cross-entropy). The supervised classification model may be modified to include the regularization term R generated by the embedding layers 266a-266c:

$$L(I, C; w) = \frac{1}{\#I}\sum_{i,c\in(I,C)} loss_c(f(i; w), c) + \frac{1}{\#U}\lambda\sum_{u\in U} R(u; w)$$

where λ is a factor controlling the regularization strength to provide an adjustment of the desired invariance versus the supervised accuracy, and I is the input (as represented by an embedding). Additional regularization terms, such as a structural risk minimization term, an empirical risk minimization term, and/or any other suitable regularization term may be introduced in addition to the regularization term R.

After multiple iterations, at step 212, a final trained neural network (function) 100a is generated. The trained neural network 100a is configured to classify a received reconstruction into one of a predetermined set of categories (or classifications). The trained neural network 100a is configured to operate on reconstruction-invariant embedding representations of the received reconstruction such that the trained neural network 100 is reconstruction-agnostic and does not require a specific reconstruction algorithm or specific reconstruction parameters to be used to generate the input reconstruction. The trained neural network 100a may be used to classify (e.g., categorize) reconstructions. For example, in some embodiments, the trained neural network 100a may be used during an imaging procedure to assist technicians and/or doctors in identifying abnormalities in nuclear imaging scans, allowing technicians/doctors to prioritize review of scan data likely containing an abnormality, and/or otherwise increase efficiency and efficacy of nuclear imaging review.

Figure 5:
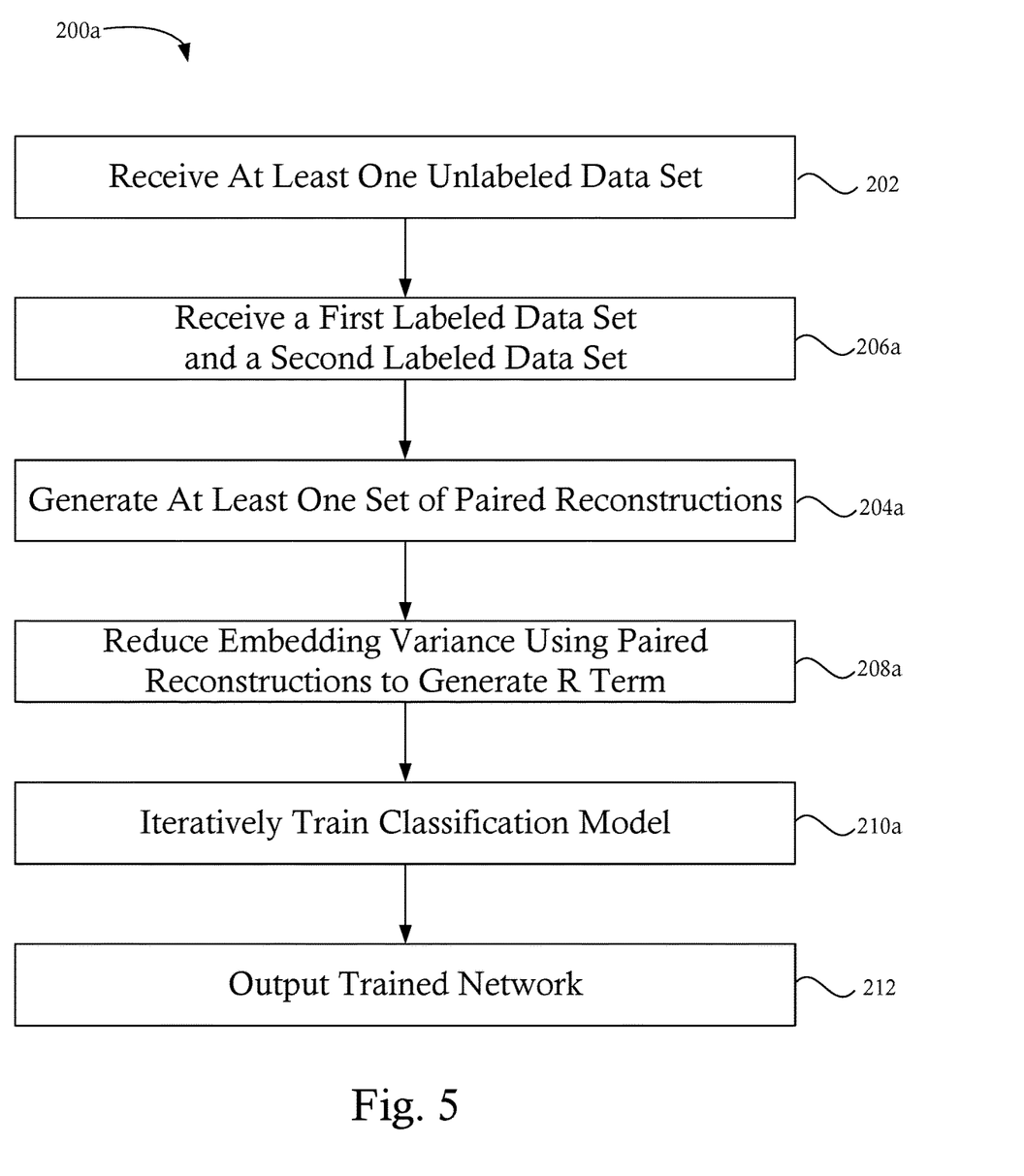
FIG. 5 is a flowchart illustrating a method of training a machine learning function using an unlabeled training data set and a plurality of labeled training data sets, in accordance with some embodiments.
Figure 6:
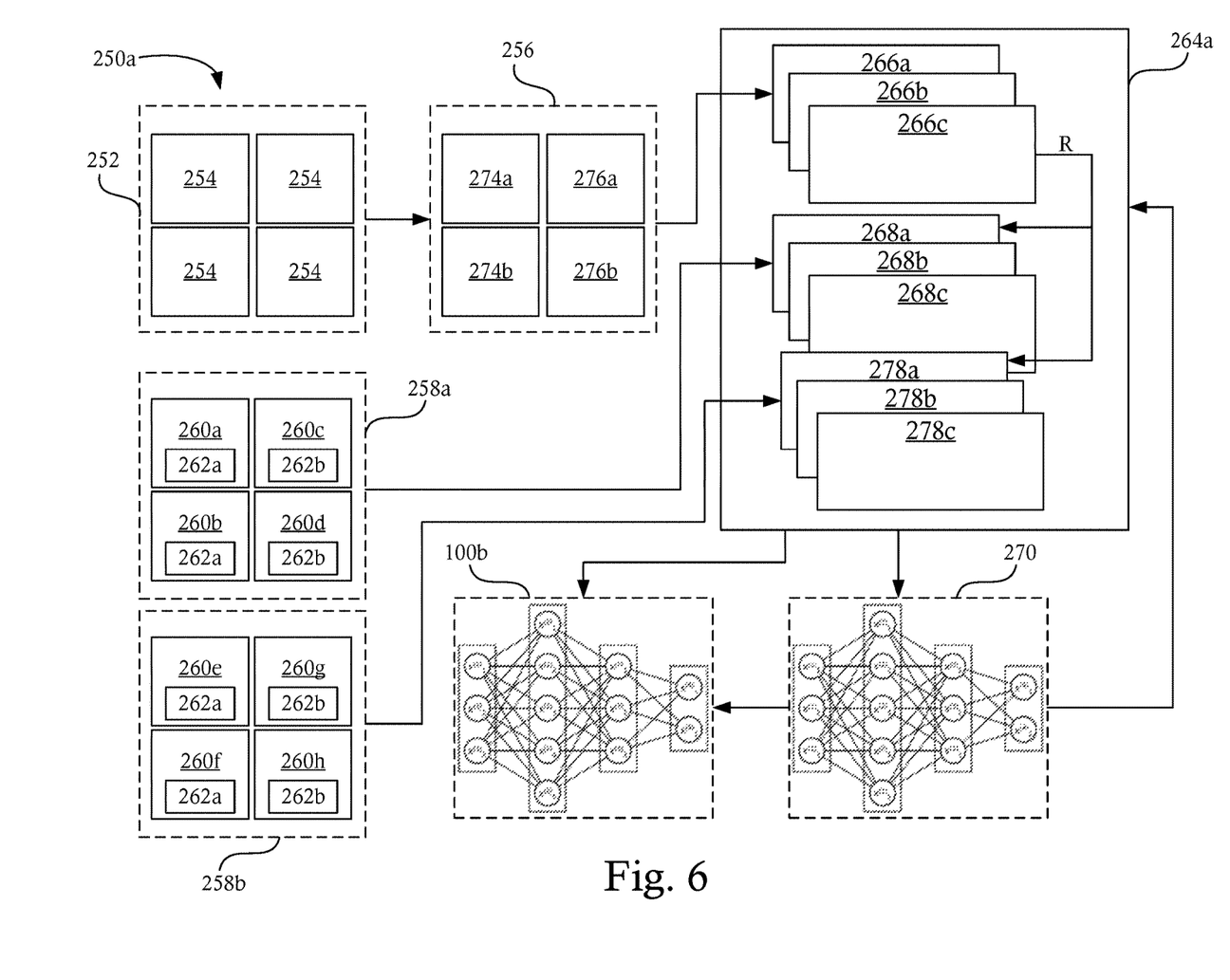
FIG. 6 is a process flow for generating a trained machine learning function to categorize reconstructions according to the method illustrated in FIG. 5, in accordance with some embodiments.

FIG. 5 is a flowchart illustrating a method 200a of generating a trained function, such as the neural network 100 discussed above, in accordance with some embodiments. FIG. 6 is a process flow 250a illustrating various steps of the method 200a illustrated in FIG. 5, in accordance with some embodiments. The method 200a is similar to the method 200 discussed above and similar description is not repeated herein. Similarly, the process flow 250a is similar to the process flow 250 discussed above and similar description is not repeated herein.

At step 206a, at least a first labeled data set 258a and a second labeled data set 258b are received. The first labeled data set 258a includes a first set of labeled reconstructions 260a-260d generated from a first set of nuclear imaging data using a first set of reconstruction parameters and the second labeled data set 258b includes a second set of labeled reconstructions 260e-260h generated from a second set of nuclear imaging data using a second set of reconstruction parameters. The first labeled data set 258a and the second labeled data set 258b include at least partially overlapping labels 262a-262b. For example, in some embodiments, each of the first labeled data set 258a and the second labeled data set 258b includes a first set of labeled reconstructions 260a-260b, 260e-260f having a first label 262a indicating a first category and a second set of labeled reconstructions 260c-260d, 260g-260h having a second label 262b indicating a second category. As another example, in some embodiments, the first labeled data set 258a may include a first set of labeled reconstructions 260a-260b having a first label 262a and a second set of labeled reconstructions 260c-260d having a second label 262b and the second labeled data set 258b may include a first set of labeled reconstructions 260e-260f having a first label 262a, a second set of labeled reconstructions 260g-260h having a second label 262b, and a third set of labeled reconstructions having a third label (not shown). Each set of labeled data sets 258a, 258b can further include data corresponding to reconstruction parameters (e.g., reconstruction algorithms, noise values, event counts, etc.), imaging modalities, anonymized patient identifiers, and/or any other suitable data associated with the reconstructions.

At step 204a (which now occurs after step 206a), a first set of unlabeled reconstructions 274a-274b and a second set of unlabeled reconstructions 276a-276b are generated from the unlabeled data set 252. The first set of unlabeled reconstructions 274a-274b are generated using the first set of reconstruction parameters (e.g., reconstruction parameters associated with the first labeled data set 258a) and the second set of unlabeled reconstructions 276a-276b are generated using the second set of reconstruction parameters (e.g., reconstruction parameters associated with the second labeled data set 258b). Reconstructions in the first set of unlabeled reconstructions 274a-274b and the second set of unlabeled reconstructions 276a-276b generated from the same set of nuclear image data (e.g., generated from the same patient data using different reconstruction parameters) are identified as paired reconstructions (e.g., reconstruction 274a and reconstruction 276a are each generated from a first set of patient data 254 and using different reconstruction parameters and are identified as paired reconstructions). In some embodiments, the first of unlabeled reconstructions 274a-274b and/or the second set of unlabeled reconstructions 276a-276b may include one or more modeled variations, such as, for example, noise level variations, count level variations, etc.

At step 208a, the set paired reconstructions 274a, 276a are provided to the embedding layers 266a-266c, which are configured to minimize variations in embeddings generated from the paired reconstructions to optimize the classification layers 268a-268c. As discussed above, a regularization term R may be introduced by the embedding layers 266a-266c to one or more classification layers 268a-268c, 278a-278c. The regularization term R causes the one or more classification layers 268a-268c, 278a-278c to utilize reconstruction-invariant parameters (i.e., parameters that do not vary based on reconstruction parameters) during classification.

At step 210a, the first labeled data set 258a and the second labeled data set 258b are used to train a set of classification layers 268a-268c, 278a-278c in an untrained model 264. The first labeled data set 258a and the second labeled data set 258b may be used sequentially and/or simultaneously to train the classification layers 268a-268c, 278a-278c. In some embodiments, the first labeled data set 258a is provided to a first set of classification layers 268a-268c and the second labeled data set 258b is provided to a second set of classification layers 278a-278c. The first and second sets of classification layers 268a-268c, 278a-278c may be combined and/or cross-trained to generate a single trained neural network (function) 100b.

In a first embodiment, a computer-implemented method for classifying a reconstruction includes receiving an uncategorized reconstruction and applying a trained classification function configured to classify the uncategorized reconstruction into one of a plurality of categories. The plurality of categories are based on a labeled data sat including a plurality of labeled reconstructions. The trained classification function uses reconstruction-invariant features for classification. The method further includes storing a label indicating a selected one of the plurality of categories for the uncategorized reconstruction.

The computer-implemented method may include receiving an uncategorized reconstruction in the first embodiment includes receiving raw nuclear imaging data and generating at least one uncategorized reconstruction using a first set of reconstruction parameters.

The trained classification function may be a neural network. The trained classification function can include at least one embedding layer and at least one classification layer.

In a second embodiment, a computer-implemented method for generating a trained neural network configured to classify a reconstruction includes receiving an unlabeled data set and a labeled data set. The labeled data set includes a plurality of reconstructions each classified into one of a first category or a second category. The method further includes generating a regularization term using one or more reconstructions based on the unlabeled data set. The regularization term is configured to reduce embedding variations. The method further includes generating a trained classification network using the labeled data set and the regularization term. The trained classification network is configured to classify unlabeled reconstructions one of the first category or the second category. The method further includes storing the trained classification network.

Generating the regularization term may include generating a first reconstruction from a first patient data set in the unlabeled data set using a first set of reconstruction parameters, generating a second reconstruction from the first patient data set in the unlabeled data set using a second set of reconstruction parameters, and minimizing a loss between the first reconstruction and the second reconstruction.

The labeled data set may include a first labeled data set including reconstructions generated using the first set of reconstruction parameters and a second labeled data set including reconstructions generated using the second set of reconstruction parameters.

The trained classification network may be generated according to an equation:

$$L(I, C; w) = \frac{1}{\#I}\sum_{i,c \in (I,C)} loss_c(f(i; w), c) + \frac{1}{\#U}\lambda \sum_{u \in U} R(u; w)$$

wherein $loss_c$ is a supervised loss function, $\lambda$ is a regularization strength factor, I is an input embedding, and R is the regularization term.

The regularization term R may be determined by:

$$R(u; w) = \frac{1}{\#P}\sum_{i,c \in (I,C)} loss_u(embedding(u_{p1}), embedding(u_{p2}))$$

wherein p1, p2 are different reconstructions, P is a set of reconstructions, and $loss_u$ is configured to penalize training parameters that create different embeddings for reconstructions.

The computer-generated method may include generating a plurality of reconstructions from using the unlabeled data set, wherein the unlabeled data set comprises a plurality of raw nuclear imaging data sets.

The computer-generated method may include validating the trained classification network using at least one validation data set comprising a plurality of labeled reconstructions.

The first category may be presence of an abnormal tissue mass and the second category may be absence of the abnormal tissue mass.

In a third embodiment, a computer-implemented method of the first embodiment may be provided by the method according to the second embodiment.

In a fourth embodiment, a system includes communications interface configured to receive an uncategorized reconstruction, a processor, and a non-transitory storage medium. The processor is configured to apply a trained classification function configured to classify the uncategorized reconstruction into one of a plurality of categories. The plurality of categories are based on a labeled data sat including a plurality of labeled reconstructions. The trained classification function uses reconstruction-invariant features for classification. The non-transitory storage unit is configured to store a label indicating a selected one of the plurality of categories for the uncategorized reconstruction.

In a fifth embodiment, a non-transitory computer-readable medium includes instructions which, when executed by a processor, cause the processor to carry out the method of the first or second embodiment.

In a sixth embodiment, a system includes a nuclear imaging scanner having at least a first modality configured to generate raw nuclear imaging data and a computer. The computer is configured to receive the raw nuclear imaging data and generate at least one reconstruction. The computer is further configured to apply a trained classification function configured to classify the uncategorized reconstruction into one of a plurality of categories. The plurality of categories are based on a labeled data sat including a plurality of labeled reconstructions. The trained classification function uses reconstruction-invariant features for classification. The non-transitory storage unit is configured to store a label indicating a selected one of the plurality of categories for the uncategorized reconstruction.

Although the subject matter has been described in terms of exemplary embodiments, it is not limited thereto. Rather, the appended claims should be construed broadly, to include other variants and embodiments, which may be made by those skilled in the art.

What is claimed is:

1. A computer-implemented method for generating a trained neural network configured to classify a reconstruction, comprising:
   receiving an unlabeled data set and a labeled data set, wherein the labeled data set includes a plurality of reconstructions each classified into one of a first category or a second category;
   generating a regularization term using one or more reconstructions based on the unlabeled data set, wherein the regularization term is configured to reduce embedding variations, and wherein generating the regularization term comprises:
      generating a first reconstruction from a first patient data set in the unlabeled data set using a first set of reconstruction parameters;
      generating a second reconstruction from the first patient data set in the unlabeled data set using a second set of reconstruction parameters; and
      minimizing a loss between the first reconstruction and the second reconstruction;
   generating a trained classification network using the labeled data set and the regularization term, wherein the trained classification network is configured to classify unlabeled reconstructions one of the first category or the second category; and
   storing the trained classification network.

2. The computer-implemented method according to claim 1, wherein the labeled data set comprises a first labeled data set including reconstructions generated using the first set of reconstruction parameters and a second labeled data set including reconstructions generated using the second set of reconstruction parameters.

3. A computer-implemented method for generating a trained neural network configured to classify a reconstruction, comprising:
   receiving an unlabeled data set and a labeled data set, wherein the labeled data set includes a plurality of reconstructions each classified into one of a first category or a second category;
   generating a regularization term using one or more reconstructions based on the unlabeled data set, wherein the regularization term is configured to reduce embedding variations;
   generating a trained classification network using the labeled data set and the regularization term, wherein the trained classification network is configured to classify unlabeled reconstructions one of the first category or the second category, wherein the trained classification network is generated according to an equation:

$$L(I, C; w) = \frac{1}{\#I}\sum_{i,c\in(I,C)} loss_c(f(i; w), c) + \frac{1}{\#U}\lambda\sum_{u\in U} R(u; w)$$

wherein $loss_c$ is a supervised loss function, $\lambda$ is a regularization strength factor, I is an input embedding, and R is the regularization term; and storing the trained classification network.

4. A computer-implemented method for generating a trained neural network configured to classify a reconstruction, comprising:
receiving an unlabeled data set and a labeled data set, wherein the labeled data set includes a plurality of reconstructions each classified into one of a first category or a second category;
generating a regularization term using one or more reconstructions based on the unlabeled data set, wherein the regularization term is configured to reduce embedding variations, wherein the regularization term R is determined by:

$$R(u; w) = \frac{1}{\#P}\sum_{i,c\in(I,C)} loss_u(embedding(u_{p1}), embedding(u_{p2}))$$

wherein $p_1$, $p_2$ are different reconstructions, P is a set of reconstructions, and $loss_u$ is configured to penalize training parameters that create different embeddings for reconstructions;
generating a trained classification network using the labeled data set and the regularization term, wherein the trained classification network is configured to classify unlabeled reconstructions one of the first category or the second category; and
storing the trained classification network.

5. The computer-implemented method according to claim 1, comprising generating a plurality of reconstructions using the unlabeled data set, wherein the unlabeled data set comprises a plurality of raw nuclear imaging data sets.

6. The computer-implemented method according to claim 1, comprising validating the trained classification network using at least one validation data set comprising a plurality of labeled reconstructions.

7. The computer-implemented method according to claim 1, wherein first category comprises presence of an abnormal tissue mass and the second category comprises absence of the abnormal tissue mass.

8. A system, comprising:
a processor, configured to apply a trained classification function configured to classify an uncategorized reconstruction into one of a plurality of categories, wherein the plurality of categories are based on a labeled data set including a plurality of labeled reconstructions, and wherein the trained classification function uses reconstruction-invariant features for classification, wherein the trained classification function is trained by:
receiving an unlabeled data set and the labeled data set;
generating a regularization term using one or more reconstructions based on the unlabeled data set, wherein the regularization term is configured to reduce embedding variations;
generating the trained classification network using the labeled data set and the regularization term; and
storing the trained classification network, wherein the trained classification network is generated according to an equation:

$$L(I, C; w) = \frac{1}{\#I}\sum_{i,c\in(I,C)} loss_c(f(i; w), c) + \frac{1}{\#U}\lambda\sum_{u\in U} R(u; w)$$

wherein $loss_c$ is a supervised loss function, $\lambda$ is a regularization strength factor, I is an input embedding, and R is the regularization term; and
a non-transitory storage unit configured to store a label indicating a selected one of the plurality of categories for the uncategorized reconstruction.

9. The system according to claim 8, wherein receiving an uncategorized reconstruction comprises:
receiving raw nuclear imaging data; and
generating at least one uncategorized reconstruction using a first set of reconstruction parameters.

10. The system according to claim 8, wherein the trained classification function is a neural network.

11. The system according to claim 10, wherein the trained classification function includes at least one embedding layer and at least one classification layer.

12. A system, comprising:
a processor, configured to apply a trained classification function configured to classify an uncategorized reconstruction into one of a plurality of categories, wherein the plurality of categories are based on a labeled data set including a plurality of labeled reconstructions, and wherein the trained classification function uses reconstruction-invariant features for classification, wherein the trained classification function is trained by:
receiving an unlabeled data set and the labeled data set;
generating a regularization term using one or more reconstructions based on the unlabeled data set, wherein the regularization term is configured to reduce embedding variations;
generating the trained classification network using the labeled data set and the regularization term; and
storing the trained classification network, wherein the regularization term R is determined by:

$$R(u; w) = \frac{1}{\#P}\sum_{i,c\in(I,C)} loss_u(embedding(u_{p1}), embedding(u_{p2}))$$

wherein $p_1$, $p_2$ are different reconstructions, P is a set of reconstructions, and $loss_u$ is configured to penalize training parameters that create different embeddings for reconstructions; and
a non-transitory storage unit configured to store a label indicating a selected one of the plurality of categories for the uncategorized reconstruction.

13. A system, comprising:
a processor, configured to apply a trained classification function configured to classify an uncategorized reconstruction into one of a plurality of categories, wherein the plurality of categories are based on a labeled data set including a plurality of labeled reconstructions, and wherein the trained classification function uses reconstruction-invariant features for classification, wherein the trained classification function is trained by:
receiving an unlabeled data set and the labeled data set;
generating a regularization term using one or more reconstructions based on the unlabeled data set, wherein the regularization term is configured to reduce embedding variations;

generating the trained classification network using the labeled data set and the regularization term; and storing the trained classification network, wherein generating the regularization term comprises:

generating a first reconstruction from a first patient data set in the unlabeled data set using a first set of reconstruction parameters;

generating a second reconstruction from the first patient data set in the unlabeled data set using a second set of reconstruction parameters; and minimizing a loss between the first reconstruction and the second reconstruction; and a non-transitory storage unit configured to store a label indicating a selected one of the plurality of categories for the uncategorized reconstruction.

14. The computer-implemented method according to claim 3, comprising generating a plurality of reconstructions using the unlabeled data set, wherein the unlabeled data set comprises a plurality of raw nuclear imaging data sets.

15. The computer-implemented method according to claim 3, comprising validating the trained classification network using at least one validation data set comprising a plurality of labeled reconstructions.

16. The computer-implemented method according to claim 3, wherein first category comprises presence of an abnormal tissue mass and the second category comprises absence of the abnormal tissue mass.

17. The computer-implemented method according to claim 4, comprising generating a plurality of reconstructions using the unlabeled data set, wherein the unlabeled data set comprises a plurality of raw nuclear imaging data sets.

18. The computer-implemented method according to claim 4, comprising validating the trained classification network using at least one validation data set comprising a plurality of labeled reconstructions.

19. The computer-implemented method according to claim 4, wherein first category comprises presence of an abnormal tissue mass and the second category comprises absence of the abnormal tissue mass.

20. The system according to claim 12, wherein receiving an uncategorized reconstruction comprises:

receiving raw nuclear imaging data; and generating at least one uncategorized reconstruction using a first set of reconstruction parameters.

* * * * *